US 12,235,890 B2

United States Patent
Chow et al.

(10) Patent No.: US 12,235,890 B2
(45) Date of Patent: Feb. 25, 2025

(54) USING TRACKING PIXELS TO DETERMINE AREAS OF INTEREST ON A ZOOMED IN IMAGE

(71) Applicant: Capital One Services, LLC, McLean, VA (US)

(72) Inventors: Chih-Hsiang Chow, Coppell, TX (US); Andrew Chouman, Northville, MI (US)

(73) Assignee: Capital One Services, LLC, McLean, VA (US)

( * ) Notice: Subject to any disclaimer, the term of this patent is extended or adjusted under 35 U.S.C. 154(b) by 437 days.

(21) Appl. No.: 17/571,056

(22) Filed: Jan. 7, 2022

(65) Prior Publication Data

US 2023/0222154 A1    Jul. 13, 2023

(51) Int. Cl.
*G06Q 30/02* (2023.01)
*G06F 16/535* (2019.01)
*G06F 16/58* (2019.01)
*G06F 16/583* (2019.01)
*H04L 67/50* (2022.01)

(52) U.S. Cl.
CPC .......... *G06F 16/535* (2019.01); *G06F 16/583* (2019.01); *G06F 16/5866* (2019.01); *H04L 67/535* (2022.05)

(58) Field of Classification Search
CPC .. G06F 16/535; G06F 16/583; G06F 16/5866; G06F 16/9577; H04L 67/535; G06Q 30/0207–30/0277
See application file for complete search history.

(56) References Cited

U.S. PATENT DOCUMENTS

| | | | |
|---|---|---|---|
| 6,112,191 A * | 8/2000 | Burke | G06Q 20/18 705/17 |
| 8,868,590 B1 * | 10/2014 | Donneau-Golencer | G06F 16/24578 707/765 |
| 9,530,160 B2 * | 12/2016 | Lau | G06Q 30/0603 |
| 10,437,879 B2 | 10/2019 | Holzer et al. | |
| 10,475,103 B2 | 11/2019 | Hiranandani et al. | |
| 11,068,931 B1 * | 7/2021 | Luttrell | G06Q 30/0242 |
| 11,087,450 B1 * | 8/2021 | Bitton | G06F 16/56 |
| 2009/0157503 A1 | 6/2009 | Farouki et al. | |
| 2013/0024474 A1 * | 1/2013 | Kraft | G06F 16/951 707/E17.014 |

(Continued)

*Primary Examiner* — Thuy N Nguyen
(74) *Attorney, Agent, or Firm* — Sterne, Kessler, Goldstein & Fox P.L.L.C.

(57) ABSTRACT

A system and method for enhancing searching capabilities is disclosed. The system and method can receive an image and metadata associated with the image. An intensity map of a grayscale vector may be generated corresponding to the image. An HTML code snippet may be placed at a coordinate location within the image and a browsing activity associated with the image may be detected. The HTML code snippet may be activated in response to detecting the browsing activity at a coordinate location. An interactive page may be rendered on a user interface, the interactive page including the image and the metadata associated with the image. The code snippet output may be correlated with the metadata to generate image browsing track data. A user browsing profile may be generated including the image browsing track data.

20 Claims, 5 Drawing Sheets

(56) References Cited

U.S. PATENT DOCUMENTS

| | | | |
|---|---|---|---|
| 2013/0185164 A1* | 7/2013 | Pottjegort | G06Q 30/02 |
| | | | 705/14.73 |
| 2015/0220941 A1* | 8/2015 | Tamir | G06Q 30/0201 |
| | | | 705/7.29 |
| 2015/0227784 A1* | 8/2015 | Roy | G06V 10/457 |
| | | | 382/103 |
| 2016/0261701 A1* | 9/2016 | Dhawan | H04N 19/91 |
| 2016/0283096 A1* | 9/2016 | Yao | G06F 3/04847 |
| 2017/0109450 A1* | 4/2017 | Athsani | G06F 16/435 |
| 2018/0032837 A1* | 2/2018 | Hiroike | G06V 40/171 |
| 2018/0165688 A1* | 6/2018 | Ismail | G06Q 30/0201 |
| 2019/0028766 A1* | 1/2019 | Wold | G06Q 50/184 |
| 2019/0073691 A1 | 3/2019 | Hanegby et al. | |
| 2019/0114663 A1* | 4/2019 | Goldman | G06Q 30/0245 |
| 2019/0332807 A1* | 10/2019 | LaFever | H04L 63/0407 |
| 2020/0233898 A1 | 7/2020 | Barzelay et al. | |
| 2020/0275167 A1* | 8/2020 | Ikezoye | G06N 20/00 |
| 2021/0149638 A1* | 5/2021 | McCulloh | G06F 16/16 |
| 2021/0259546 A1* | 8/2021 | Santos Garcia | A61B 5/7264 |
| 2021/0264195 A1* | 8/2021 | Ingram | G06F 16/5866 |
| 2021/0295010 A1* | 9/2021 | Ross | G06V 40/63 |

* cited by examiner

USING TRACKING PIXELS TO DETERMINE AREAS OF INTEREST ON A ZOOMED IN IMAGE

TECHNICAL FIELD

Aspects relate to systems and methods for enhanced tracking of browsing behavior in computing systems.

BACKGROUND

Identifying user engagement with content on a website or a mobile application platform enables content providers to produce a more unique and tailored experience to the user. This, in turn, can improve the user experience, leading to increased user engagement. When a content provider displays specialized content (e.g., an image, a video, animation, or the like) within the website or the mobile application platform, current analytics tools merely capture user browsing activities relating to the website but not interactions with the specialized content. For example, current analytics may generate information relating to whether or not a user visited a website and/or clicked on an item. Current analytics may also capture the time spent by the user on a specific web page. However, this creates a missed opportunity for content providers that currently do not capture additional browsing activities associated with user interaction of the specialized content.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

In the drawings, like reference numbers generally indicate identical or similar elements. Additionally, generally, the left-most digit(s) of a reference number identifies the drawing in which the reference number first appears.

DETAILED DESCRIPTION

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

Figure 1:
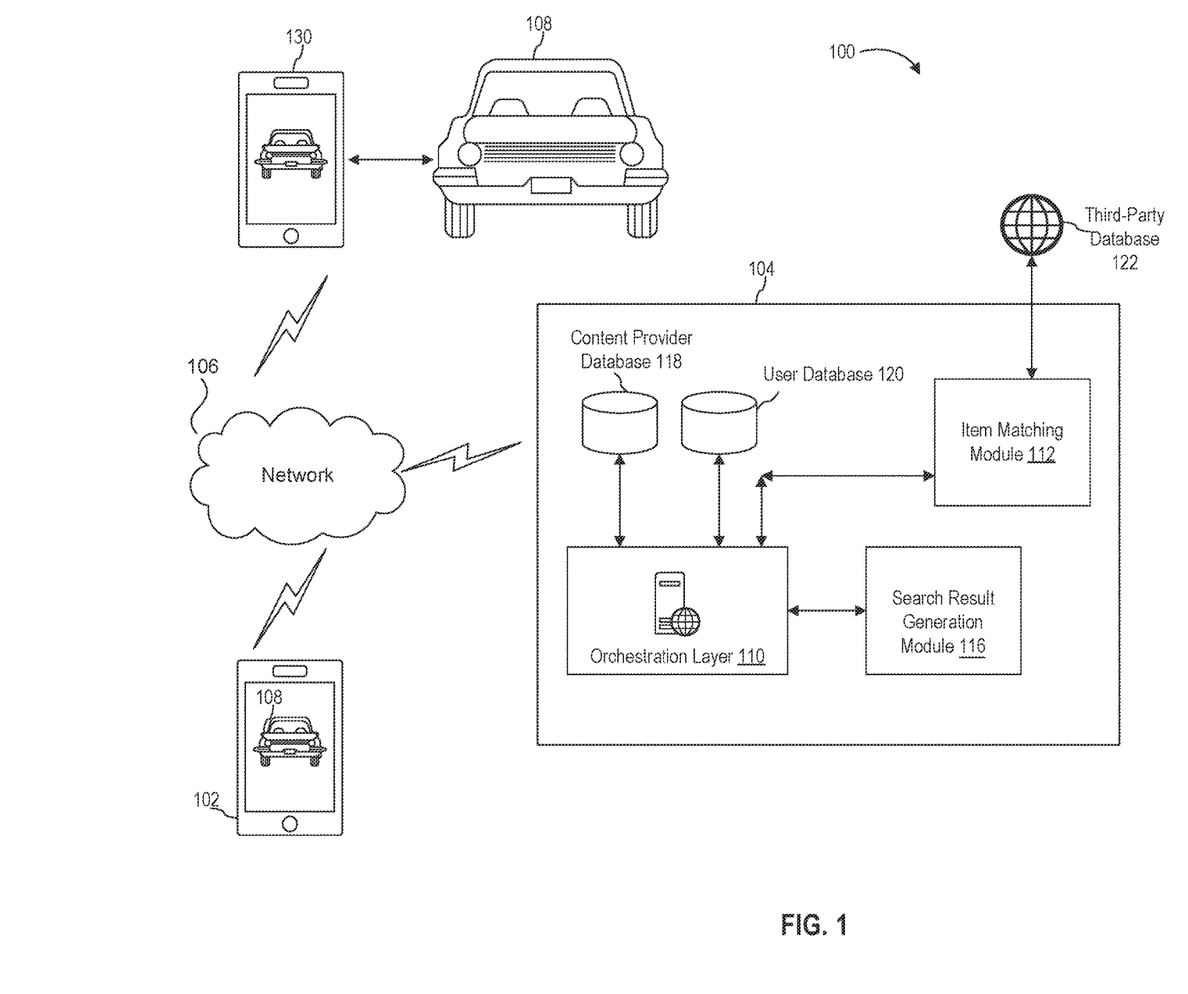
FIG. 1 is an example system for generating search results according to aspects.

FIG. 1 is an example system 100 for performing searching operations according to aspects. The search operations refer to suggested results of products and services that are likely to be acceptable to a user and improve an opportunity for user engagement with the content provided in the search results. For example, whenever a user is shopping on a website or on a mobile app associated with a content provider or performing a search on a third party platform, many times users may click on an image and interact with the image (e.g., zoom in on different portions of the image) to look at more details of the image. For example, if the image includes multiple components, e.g., an image of a vehicle that includes certain modifications, external components (e.g., wheels, tires, colors, after market components and accessories, etc.), and/or interior specifications (e.g., multi media systems, navigation systems, transmission, etc.), a user may zoom into the image to find out more about those details. When a user visually interacts with an image through zoom navigation for example, system 100 may capture such interaction and build (or augment) a user profile based on such image interactions. It can be appreciated that a user may be any person, entity, computer code, etc., that engages a browsing activity on the website or the mobile app, including, for example, a user.

In some aspects, the user may be interested to find out more about a specific search result (such as a product) and can do so by zooming into an image of the search result. Current web analytics, however, at best may capture that a user viewed an image and not that the user navigated the image and zoomed in to view components of the image. For example, current web analytics do not provide information relating to the actual x,y plane that the user is viewing or detect components/aspects of an image that the user interacted with. This creates a significant missed opportunity in gathered data that can potentially be mined and analyzed to compile future search results (e.g., product recommendations). According to some aspects, when the user interacts with a displayed image, system 100 may capture such interactions with the image and components of the image zoomed into by the user, and generate/augment a user profile with such data that can enhance a search capability of system 100.

In some aspects, system 100 provides for solutions that can improve searching abilities by aligning search results more closely with user behavior, and especially with user behavior relating to browsing activities of images, such as product images. In some aspects, system 100 may be implemented on a server 104. Server 104 may be a variety of centralized or decentralized computing devices. For example, server 104 may be a mobile device, a laptop computer, a desktop computer, grid-computing resources, a virtualized computing resource, cloud computing resources, peer-to-peer distributed computing devices, a server farm, or a combination thereof. The cloud computing resources may be part of a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud environment similar to a public cloud with the exception that it is operated solely for a single organization.

Server 104 may be centralized in a single room, distributed across different rooms, distributed across different geographic locations, or embedded within a network 106. In aspects, server 104 can be coupled with network 106 to communicate with other devices, such as a client device 102 and content provider device 130. While server 104 can couple with network 106 to communicate with other devices (for example client device 102), server 104 can also be a stand-alone device.

In some aspects, client device 102 may be any of a variety of devices, such as a user mobile device, for example a smart phone, a cellular phone, a personal digital assistant, a tablet computer, a notebook computer, a laptop computer, a handheld scanner, etc. Client device 102 can couple, either directly or indirectly, to network 106 to communicate with server 104 or may be a stand-alone device.

According to some aspects, network 106 may be a telecommunications network, such as a wired or wireless network. Network 106 can span and represent a variety of networks and network topologies. For example, network 106 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in network 106. Cable, Ethernet, digital subscriber line (DSL), fiber optic lines, fiber to the home (FTTH), and plain old telephone service (POTS) are examples of wired communication that may be included in network 106. Further, network 106 can traverse a number of topologies and distances. For example, the network 106 can include a direct connection, personal area network (PAN), local area network (LAN), metropolitan area network (MAN), wide area network (WAN), or a combination thereof.

For illustrative purposes, in FIG. 1, server 104, client device 102, and content provider device 130 are shown as endpoints of network 106. This, however, is exemplary and it is understood that there may be different partitions between the server 104, client device 102, content provider device 130, and network 106. For example, server 104 and client device 102 may be implemented to function as part of network 106. In another example, content provider device 130 may also communicate with server 104 through network 106. In one example, content provider device 130 may capture information relating to an object 108 (that may be of interest to a user). In one example, object 108 may be a vehicle. It can be appreciated to those skilled in the art that object 108 may represent any product or service that may be of interest to a user, including, for example, goods, furniture, health care products, and/or services including financial services, cleaning services and the like. For illustrative purposes hereinafter, object 108 may be used as an example object of interest for user 108.

In some aspects, server 104 can include modules to perform some or all of its functionality. In the aspect shown in FIG. 1, the modules include an orchestration layer 110, an item matching module 112, and a search result generation module 116. The modules and how they facilitate the operation of the server 104 will be discussed further below. It can be appreciated that each of the modules may be performed by one or more processors of server 104, and/or may all be performed by a single processor of server 104. In some aspects, some or all of the modules may be implemented on any of the devices of the system 100. In the aspect shown in FIG. 1, all of the modules are shown as being implemented on the server 104. This, however, is exemplary and in other aspects, some or all of the modules may be implemented on client device 102.

With respect to the process by which the system 100 generates the search results, in some aspects, and as shown in FIG. 1, a content provider may generate an inventory of goods that the content provider sells. For example, the content provider, using content provider device 130, may create an inventory of goods (e.g., a vehicle captured in vehicle image 108) that the content provider wishes to offer for sale. In one example, the content provider may generate vehicle image 108 and provide metadata associated with the image. For example, metadata associated with the image may include information associated with components of the vehicles found within the image (e.g., spoiler, door, fender, model number, price, color, model range, manufacturer, and the like).

According to some aspects, server 104 may be configured to provide content provider device 130 an ability to input and associate the metadata with object 108 manually. For example, server 104 may provide a content provider (e.g., a merchant, whole seller, third party seller, search engine, and any service providing entity) associated with content provider device 130 a pop up graphical user interface (GUI) that enables the content provider to input metadata describing the components within the image of object 108 (e.g., lights, doors, windows, steering wheels, wheels, tires, color, make, model, model range, and other interior and exterior components and accessories). Server 104 may also enable the content provider to associate the metadata with corresponding locations of the object's components in the image. In some aspects, a location in an image is identified by a particular pixel or set of pixels in the image. In some aspects, a location in an image is identified by an x, y coordinate or a range of x, y coordinates within the image. For example, prior to uploading an inventory item into content provider database 118, for example, server 104 may provide the content provider an ability to perform a tagging operation prior to uploading the inventory. In one example, the content provider may select a particular location or area within the image of, for example, object 108, and input one or more descriptions (e.g., metadata) of the particular component shown at the particular location. For example, if the image is that of an interior portion of a vehicle, the content provider may select a location or area on the image, a steering wheel, for example, and provide metadata describing the steering wheel (e.g., size, year of make, model vehicles incorporating the steering wheel, air bag capabilities, electronic controls/functions, etc.) It can be appreciated that such tagging operations may also be performed using trained convolutional neural networks (CNN) that can process an image for the content provider and allow the content provider to populate metadata associated with the image, which will allow for scalability and more efficient production of tagged images.

According to some aspects, server 104 may use the metadata to capture the different components of an image of an object so as to more closely populate a user profile. For example, as will be further described herein below, upon tracking user browsing activities, server 104 may correlate captured user browsing activity with the metadata to generate a more comprehensive user profile. Such user profile may enable server 104 to provide better tailored search results for a user.

According to some aspects, server 104 may receive the inventory including images and associated metadata. Server 104 may execute image analysis on the images as well. For example, in cases where a content provider did not provide metadata, server 104 may execute an image analysis algorithm on the received images to generate metadata that can improve generating search results. For example, server 104 may use a deep learning algorithm, such as a convolutional neural network (CNN) to analyze visual imagery to identify objects (or components of objects) or events in an image. This may be the case where an image provided by a content provider does not have sufficient metadata to describe components of an object (e.g., image may have metadata identifying a vehicle, but not additional components of the vehicle like door, color, and the like). While the present example describes a CNN algorithm deployed within server 104, it can be appreciated that the CNN algorithm may also be deployed within content provider device 130 to enable a content provider to tag and categorize image content.

According to some aspects, applications of the CNN algorithm are not limited to generating metadata. For example, even in cases where server 104 receives inventory including associated images and metadata, server 104 may still apply the CNN algorithm to further process the received images in order to strategically allocate one or more HTML code snippets within the image. For example, server 104 may process each received image to generate a mapping of the components of the image and standardize the mapping of components with the metadata and specific pixels or coordinate tags within the image. For example, assuming the received image is an image including vehicle 108, server 104 may perform image processing using CNN algorithm so as to generate a coordinate for each one of the detected components. According to some aspects, server 104 may then correlate the generated coordinates for each one of the detected components with the received metadata (and specific pixels/coordinate tags) from the content provider. In this regard, server 104 is able to know the specific coordinate of a component within the image and the metadata describing information about the component. According to some aspects, server 104 may then allocate one or more HTML code snippets at the generated coordinates.

The following is a non-limiting example of image processing techniques employed by server 104 according to aspects described herein. For example, server 104 receives vehicle image 108 from a content provider. Vehicle image 108 may include metadata describing components of vehicle image 108 and coordinate tags indicating locations of the components within the image. According to some aspects, server 104 processes the vehicle image 108 and determines that the image includes four components: headlight, windshield, grill, and bumper. Such determination may be made from processing the metadata and the coordinate tags, and/or by utilizing the CNN image processing techniques described herein. After processing the vehicle image 108, server 104 now knows the number of components within vehicle image 108, the locations of those components (both from the received coordinate tags and confirmed by the server's own generated mapping), and descriptions of those components. For example, at this stage, server 104 can determine that vehicle image 108 contains four components (headlight, windshield, grill, and bumper), where each component is located (or within what region), and descriptions of those components (e.g., chrome grill, produced in a specific year for a specific model, etc.). According to some aspects, server 104 may then place four HTML code snippets (also referred to as tracking pixels) within each of the four components. Server 104 may generate an image data file associated with the processed image (e.g., including metadata, coordinate tags, confirmed mapping, and location of the allocated HTML code snippets). Server 104 may store the generated image data file in content provider database 118. Upon detecting a browsing operation within the image, e.g., when a user performs a zoom in operation on one of the components, e.g., bumper, the HTML code snippet is triggered and executed, generating a browsing activity tracking data output. According to some aspects, server 104 may then correlate the browsing activity tracking data output with the generated image data file to produce a user data file indicating that the user viewed the component and providing a time window associated with the viewing activity and all associated metadata. According to some aspects, server 104 can then store the user data file in a user profile stored on user database 120. It can be appreciated that the example described herein is illustrative and any image of any object with a plurality of components may be processed. Such objects may include a wide variety of consumer goods, for example, as would be understood by those skilled in the art.

In some aspects, the CNN algorithm is trained by two phases, a forward phase and a backward phase. The forward phase may include a convolution layer, pooling layer, and fully-connected layer. The convolution layer may apply filters to an input image received from the content provider to generate a feature map. The pooling layer may generate a reduced feature map. The fully-connected layer may classify the features of the image using weights and biases—e.g., the four components described herein above. The values of the filters, weights, and biases may be parameters received by the CNN algorithm.

In some aspects, the CNN algorithm initially receives an input image (e.g., an image from the content provider) and randomly assigned values for filters, weights, and biases. The CNN algorithm can determine whether it correctly identified objects in the image using, for example, a loss function. Next, in the backward phase, the CNN algorithm can use backpropagation to determine whether the CNN algorithm was able to identify the objects in the image correctly. The CNN algorithm can update the values for the filters, weights, and biases using, for example, a gradient descent algorithm, and re-execute the forward phase on the input image. As such, the CNN algorithm can be trained to identify objects or events in the input image using feature learning and classification. In some aspects, feature learning includes the convolution layer and the pooling layer, while the classification includes the fully connected layer.

In the convolution layer, the CNN algorithm performs feature extraction on the input image. The CNN algorithm applies a small array of numbers (e.g., kernel) across the different portions of the input image. The kernel may also be referred to as a filter. As described above, values of the filters or kernels can be randomly assigned and optimized over time. Different filters can be applied to the input image for generating different features of maps. For example, the filter for identifying an object in the image may be different than the filter for edge detection. The kernel can be applied as a sliding window across different portions of the input image. The kernel can be summed with a given portion of the input image to generate an output value. The output value can be included in a feature map. The feature map can be a two-dimensional array. The final feature map can include an output value from the kernel applied to each portion of the input image. The features can be different edges or shapes of the image. In some aspects, the features may be the four components associated with vehicle image 108. It can be appreciated that detecting features may still require a correlation with metadata in order to identify each feature and associated information (e.g., as noted herein, a steering wheel with all relevant information, or a bumper with all relevant information).

In the pooling layer, the CNN algorithm may reduce the dimensionality of the feature map. In particular, the CNN algorithm may extract portions of the feature map and discard the rest. Pooling the image keeps the important features while discarding the rest. This way, the size of the image is reduced. The CNN algorithm may use max or average pooling in the pooling layer to perform these operations. Max pooling keeps the higher values of portions of the feature map while discarding the remaining values. Average pooling keeps the average value of different portions of the feature map. The CNN algorithm may generate a reduced feature map in the pooling layer.

In the fully connected layer, the CNN algorithm may flatten the reduced feature map into a one-dimensional array (or vector). For example, the CNN algorithm may generate an intensity map of a grayscale vector corresponding to the image. In this regard, the CNN algorithm may identify features (or components) of an object within the image and generate an intensity map identifying each detected feature. Taking the image of a vehicle 108 as an example, CNN algorithm may generate an intensity map assigning different intensities to different detected features (or components) of the object in the image (e.g., different intensities for doors, spoilers, windows, tires, wheels, etc.). The fully connected layer may be, for example, a neural network. The CNN algorithm performs a linear and non-linear transformation on the one-dimensional array. The CNN algorithm can perform the linear transformation by applying weights and biases to the one-dimensional array to generate an output. Initially, the weights and biases are randomly initialized and can be optimized over time.

According to aspects, server 104 stores the inventory and associated images that have been processed by the CNN algorithm in content provider database 118 (e.g., image data file) on a continuous rolling basis as more images are sent from the content provider.

According to some aspects, server 104 builds a user profile for a user (e.g., a customer) associated with client device 102 and stores the profile in user database 120. It can be appreciated that server 104 may build the user profile on a continuous basis so as to continuously enhance the user profile. Server 104 may then provide improved search results that closely align with a user's preferences based on the search query as well as the user profile.

Server 104 may build the user profile in one or more different ways. In one example, server 104 may build the user profile by tracking browsing activities of the user and associating the tracked browsing activities with one or more image data files stored in content provider database 118 as described herein. According to some aspects, if a user does not have a profile stored in user database 120, server 104 may prompt user 102 to create an account. Additionally, or in the alternative, server 104 may also generate a user profile (e.g., a web browser cookie) and populate the generated user profile with tracked browsing activities thereafter. In this regard, the user profile may be maintained so long as the web browser cookie is not erased. In some aspects, where a user subsequently chooses to create a profile, server 104 may correlate the browser cookie with the user account and associated the existing profile based on the web browser cookie with the user.

According to some aspects, a new user may be interested in searching for an object (e.g., a painting or a vehicle, etc.). Server 104 may receive, via an application on client device 102, a search query associated with the object. The term "application" refers to a software application or computer program. In aspects, if the client device 102 is a mobile device, the application can be analogous to a mobile application (also referred to as a mobile app.) installed on the client device 102 from which a user can interact with the system 100. In aspects, if client device 102 is a notebook computer or desktop computer the application can be a desktop application. In other aspects, the application can be installed on a browser of client device 102 as an applet, widget, or plugin.

In aspects, the user can utilize the application to provide information to the system 100. In aspects, the information can include information about the item the user wants to purchase. In aspects, this may be provided manually by selecting the item from a list of items displayed on the screen of the application and having the application transmit pre-populated information about the item to the other components of the system 100. In other aspects, the information may be provided in a search string provided by the user. It can be appreciated that the user may search or browse for items stored in content provider database 118. Accordingly, if a user of the client device 102 is browsing for an item via the application, server 104 may begin to track user interaction with the images as further described herein.

For the purposes of this disclosure and with respect to FIG. 1, the system 100 is described with respect to the scenario where a user may be browsing for and/or attempting to purchase a vehicle displayed in vehicle image 108 (and/or associated components). This, however, is not meant to limit the system 100 solely to aspects for purchasing a vehicle. The system 100 can function similarly with other items users desire to purchase or search for. For example, a user may be interested in purchasing a painting, and may view images of specific paintings with specific scenic motifs (e.g., nature) and/or genre (e.g., abstract) and/or color (e.g., light tones). Such information may be discerned by server 104 according to examples described herein in order to generate a more robust user profile that can narrow search results. For example, if it is determined from detection of the browsing history that a user is browsing a painting by a famous painter, then server 104 may populate such metadata information in the user profile. Accordingly, when a user attempts to search for a painting in the future, even if the user inputs search strings relating to general art, color pallets, etc., server 104 may prioritize search results that of the famous painter that meet the search criteria provided by the user.

In some aspects, the search request is received by server 104 at the orchestration layer 110. The orchestration layer 110 may be a service of the system 100 that can serve as an entry point for the search request. In aspects, the orchestration layer 110 can coordinate information retrieval and perform task allocations for the server 104. For example, the orchestration layer 110 can comprise one or more software applications, programs, or lines of code that when executed by a processor can implement instructions that facilitate information transmission and retrieval to and/or between the modules of the server 104, and can coordinate execution of the modules.

In some aspects, once the search request is received at the orchestration layer 110, the orchestration layer 110 passes the search request to the item matching module 112. The item matching module 112 identifies the item the user wants to purchase based on the search request and based on the user profile. In cases where the user has yet to establish a profile or where the user has a very limited profile, matching module 112 may provide recommendations relying on other similar user profiles in user database 120 or third party database 122. The third-party database 122 can contain product information that may be used to generate a list of alternative inventory items. In some aspects, third-party database 122 may be managed by a third-party vendor, which is external and independent of the company or institution implementing the system 100.

By way of example, where the user wants to purchase the vehicle in vehicle image 108, the list of alternative inventory items can comprise cars that are similar to or the same as car 108 in terms of make, model, body style, vehicle category, features, etc. that were the subject of past searches of other users. It can be appreciated that where a user has an established profile stored in user database 120, orchestration layer 110 may rely on the user profile to generate search results and/or alternative inventory items.

In some aspects, item matching module 112 processes the received search request from orchestration layer 110. In doing so, item matching module 112 may access user database 120 to access a profile associated with the user (and including one or more user data files) and content provider database 118 to search for objects/products that match the search request. In some aspects, item matching module 112 may refine the search based on the user profile (e.g., the one or more user data files). For example, if a user has previously searched for a car, and the one or more user data files indicate that the user prefers white cars, then item matching module 112 may refine the search to focus on white cars.

In some aspects, once candidate objects/products are identified by item matching module 112, they are then passed to the search result generation module 116. The search result generation module 116 can generate a search result and transmission to client device 102.

It can be appreciated that in some aspects, server 104 may assign different weights to search results refined by the user profile. For example, where server 104 knows that the user has previously browsed through images of white cars, search results including white cars may receive higher priority weight than search results including cars of different colors. In this regard, the user may receive a prioritized search result that prioritizes search results that more closely match the user's prior browsing behavior while also presenting the user with other search results to provide a tailored and complete searching experience.

In aspects, system 100 can also learn from the search results it generates, and can have feedback input back into system 100 relating to whether the search results were satisfactory to the user or not, whether subsequent searches were performed, and whether a sale occurred or not, so as to continually learn and to constantly improve its ability to generate search results offers. For example, this may be done by having the search request for which system 100 generated search results fed back into the databases (e.g., user database). This feedback may be used by system 100 as data from which it can generate future search results. In this way, system 100 can continuously build on its outputs and further refine its ability to provide customized and tailored search results as the data points increase. In aspects, machine learning processes and/or algorithms may be used to facilitate this learning process and train system 100 to generate improved search results. For example, machine learning processes such as neural networks may be implemented as a part of system 100 to learn patterns of search requests/results, so that system 100 can use those learnings and/or patterns to generate future search results. In this way, system 100 may become more intelligent as the data pool of user interaction increases.

In some aspects, system 100 can also be implemented as a real-time system such that system 100 generates the search results in real-time from when the search request is received. Real-time refers to system 100 generating the search results within milliseconds or seconds from when the search request is received so that the search results are able to be transmitted to client device 102 almost instantly from when the client device 102 provides the request.

It can be appreciated that the system 100 described above improves the state of the art from conventional systems because it provides a novel way to generate highly targeted search results that can expedite result matching for users, and increase engagement opportunities with content providers. The system does this by capturing user interaction with images and creating or augmenting a user profile that is relied on when generating search results. The ability of system 100 to provide these targeted search results significantly reduces search time by leveraging technology and data in an intelligent manner to derive search results likely to be acceptable to a user and more closely identifies relevant content.

System 100 also improves conventional systems by implementing machine learning features that can enable the system 100 to learn from the search results it generates, and shifting user browsing behavior. Moreover, system 100 also improves conventional systems by implementing machine learning features that can perform image processing and correlate portions of images with metadata that can then be matched with user search requests. The machine learning capabilities can ensure that system 100 learns from its past search results and user interactions and learns patterns based on past search results, browsing data and purchases. In this way, system 100 can continuously improve its ability to generate search results, leading to a more intelligent computing system that can ultimately provide search results that do not need to be revised by the user.

Methods of Operation

Figure 2:
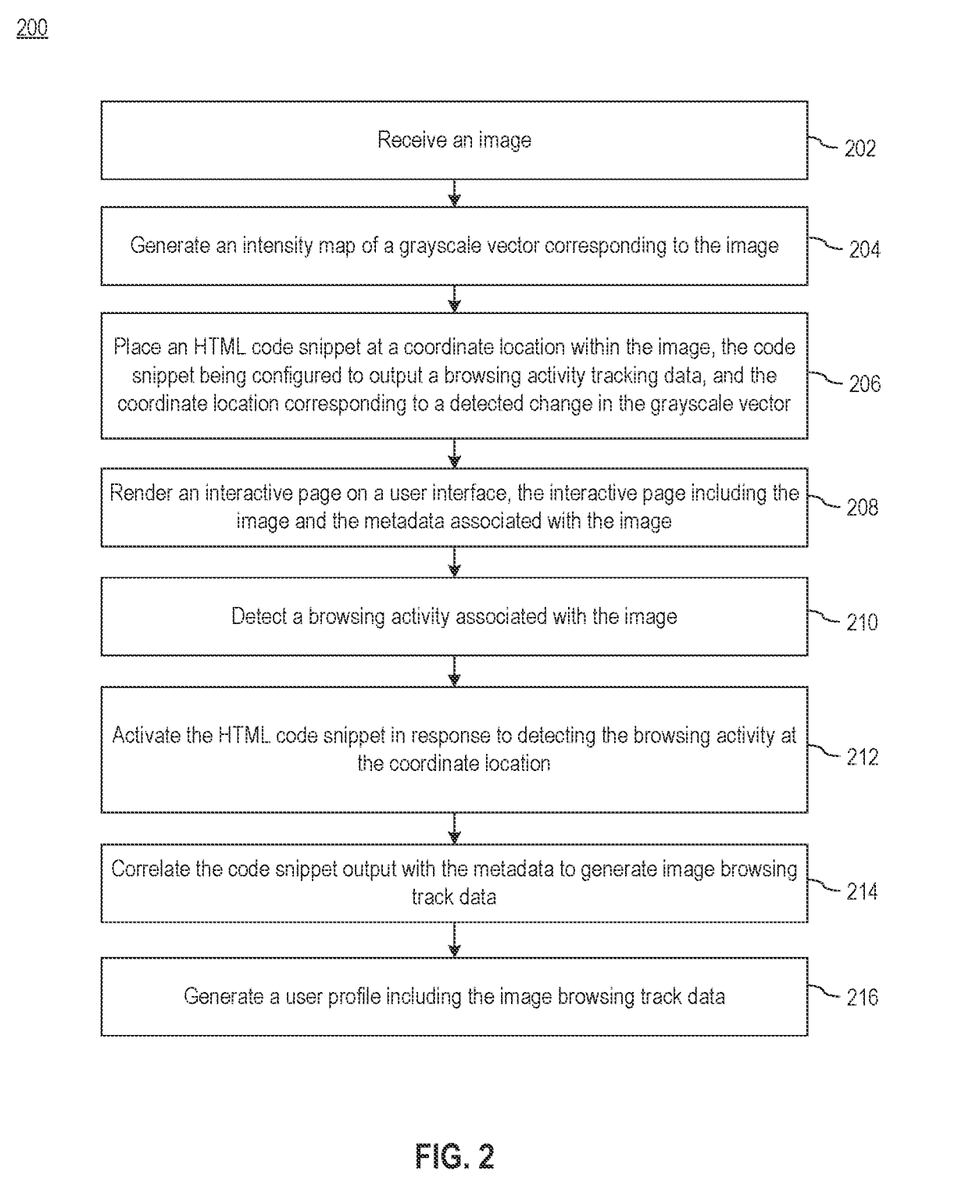
FIG. 2 is an example method of operating the system according to aspects.

FIG. 2 is an example method 200 tracking user activity, according to aspects. Method 200 may be performed as a series of steps. While method 200 is described with reference to system 100 as an example, a person of skill in the art would recognize that other content delivery systems may also be used to implement method 200.

At step 202, system 100 may receive an image from an external source, e.g., a content provider.

At step 204, system 100 may generate an intensity map corresponding to the image. As described herein, the intensity map may be used to extract features associated with one or more objects within the image. At step 206, system 100 may place an HTML code snippet at a coordinate location within the image, the code snippet being configured to output a browsing activity tracking data. According to some aspects, the coordinate location may correspond to a detected feature. In one example, where an intensity map is generated, the coordinate location may correspond to a detected change in the grayscale vector of the intensity map.

This may enable feature identification/extraction of a plurality of features (e.g., where an object has a plurality of components).

At step 208, system 100 may render an interactive page on a user interface. According to some aspects, the interactive page may be rendered within an application, a web browser, or the like. According to some aspects, the interactive page may include an image and metadata associated with the image. For example, a search may have already been requested by a user or a user is simply browsing one or more merchant catalogs provided by system 100. As described herein, the image may be an image of an object (e.g., an item of interest for the user like vehicle 108) and the metadata associated with the image may be descriptive information of the object. At step 210, system 100 may detect a browsing activity associated with the image. For example, as described herein, system 100 may detect a user browsing/interaction with an image. At step 212, system 100 may activate the HTML code snippet in response to detecting the browsing activity at the coordinate location. At step 214, system 100 may correlate the code snippet output with the metadata to generate image browsing track data. At step 216, system 100 may generate or augment an existing user profile to include the image browsing track data. Such data, as described herein, may be used to refine and improve search results provided to the user for future searches, as described further with reference to FIG. 3.

Figure 3:
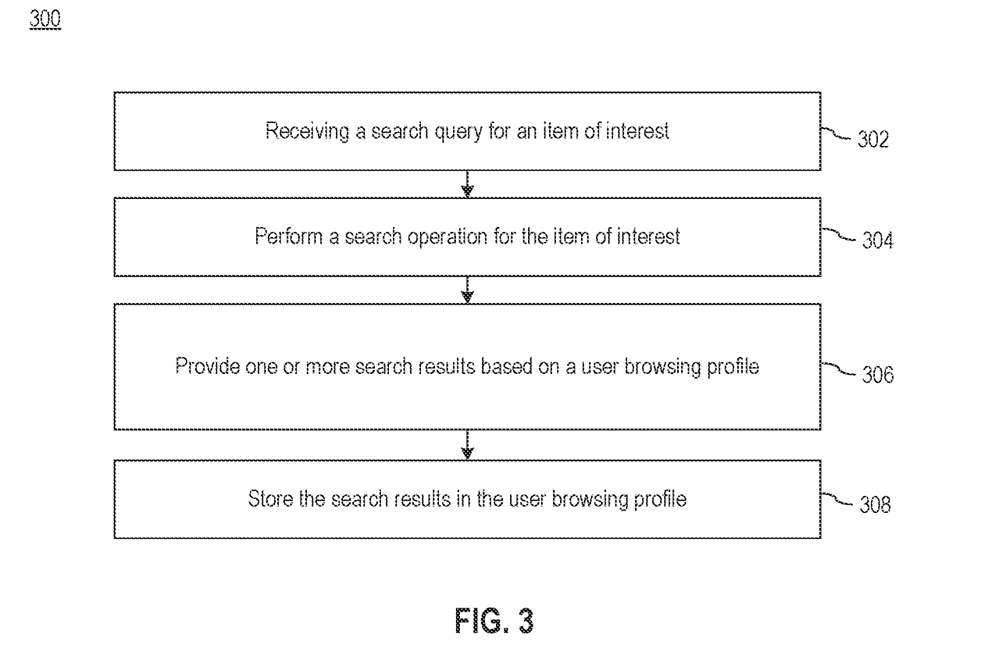
FIG. 3 is an example method of operating the system according to aspects.

FIG. 3 is an example method 300 of operating the system 100 according to aspects. While method 300 is described with reference to system 100 as an example, a person of skill in the art would recognize that other content delivery systems may also be used to implement method 300.

At step 302, system 100 may receive a search query for an item of interest from the user. At step 304, system 100 may perform a search operation for the item of interest. As described herein, system 100 may perform the search operation based on the search query and the user profile generated by system 100. At step 306, system 100 may provide one or more search results based on the user's profile. At step 308, system 100 may store the search results in the user browsing profile for continued adaptation/growth of system 100.

It can be appreciated that system 100 may perform additional steps (not illustrated herein) when providing improved search capabilities for a user. For example, system 100 may monitor a time window associated with browsing activity, and in response to the time window exceeding a predetermined time threshold, capture the browsing activity tracking data output by the HTML code snippet. For example, a user may browse an image for a few seconds, which may indicate that the user is not necessarily focused on a specific component. Accordingly, system 100 may elect to ignore this browsing activity until it exceeds a predetermined time threshold (e.g., five seconds), which may indicate to system 100 that the user is interested. According to some aspects, system 100 may detect a zoom-in activity associated with the browsing activity, and measure a time duration of the zoom-in activity. In response to the time duration being above a predetermined threshold value, system 100 may identify at least one coordinate associated with a zoom-in region (e.g., a detected feature) and identify metadata associated with the at least one coordinate (e.g., descriptions of the extracted feature). System 100 may then correlate the identified at least one coordinate with the identified metadata to generate updated image browsing track data, and augment the user browsing profile with the updated image browsing track data.

GUI Interfaces of the System

Figure 4:
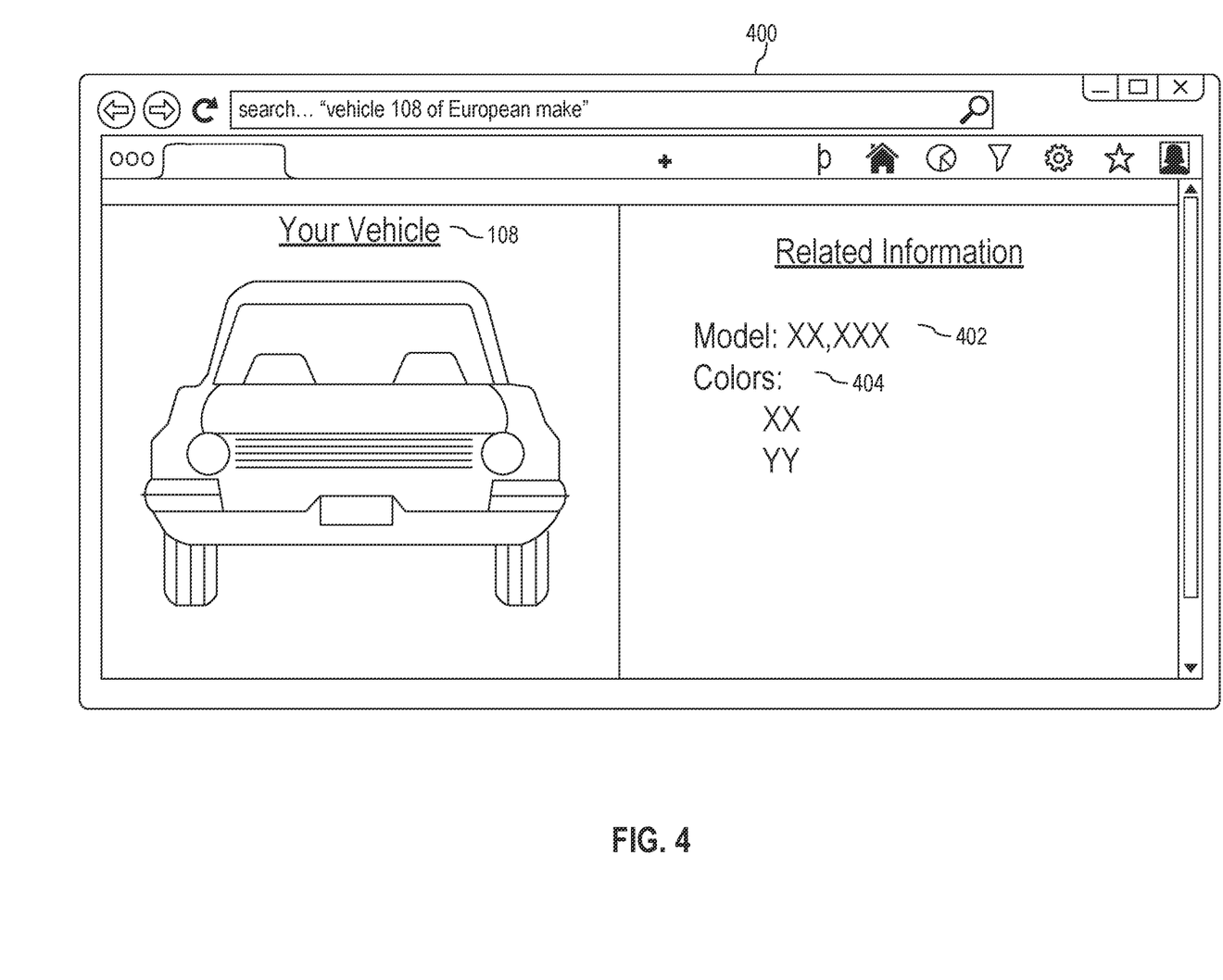
FIG. 4 is an example GUI displaying the search result to a user according to aspects.

FIG. 4 is an example GUI 400 displaying the search results to a user according to aspects. In some aspects, GUI 400 may be displayed on the client device 102, via the application. In some aspects, what may be displayed on the GUI 400 as part of the search result is information related to the search result. For example, when the search result is a vehicle (e.g., vehicle 108), GUI 400 may include related information such as vehicle type and model number 402 and any other attributes associated with the vehicle, e.g., colors 404. In aspects, other information may be displayed. For example, in the aspect where the user wants to purchase the car 108, a graphic of the car 108 and/or a description of the features of the car 108 can also be displayed in a window or pane of the GUI 400 along with price and financing information.

Components of the System

Figure 5:
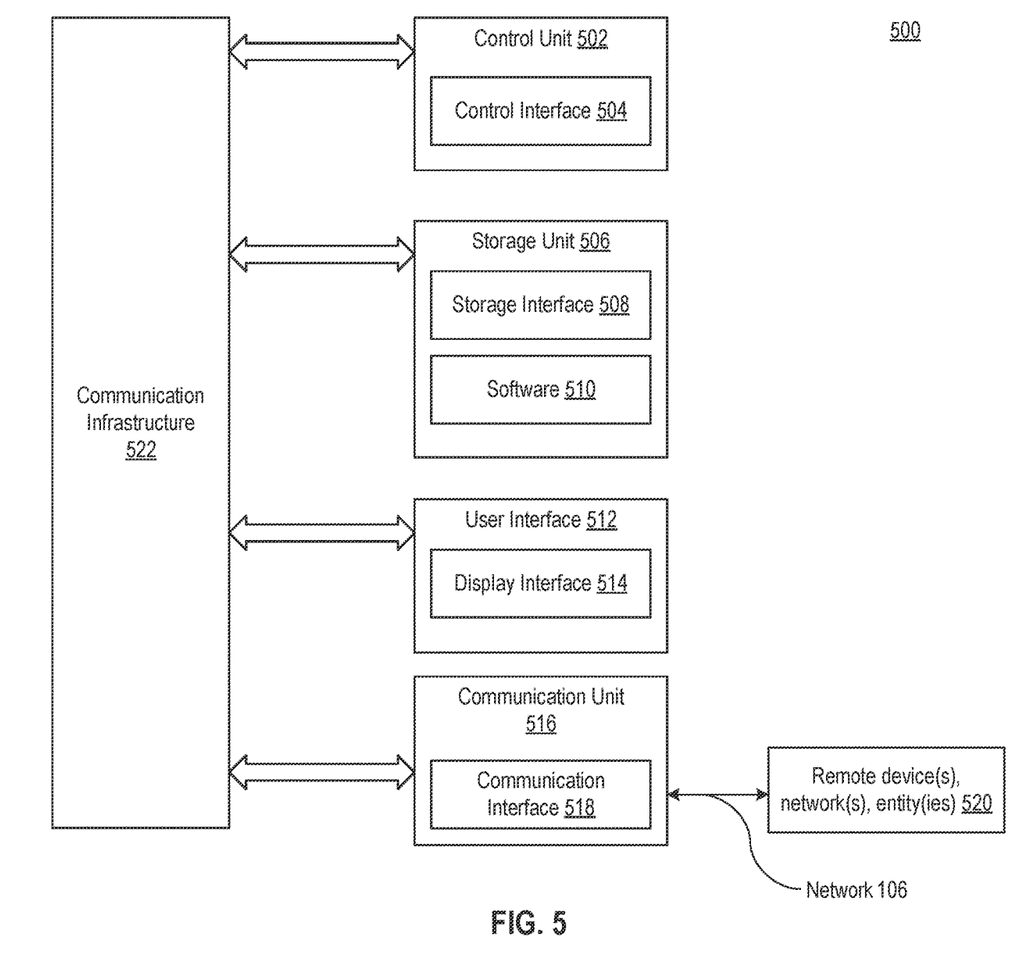
FIG. 5 is an example architecture of the components of the system according to aspects.

FIG. 5 is an example architecture 500 of one or more components of system 100 according to aspects. The components may be the components of server 104 on which system 100 is implemented, or may be components of client device 102. In aspects, the components may include a control unit 502, a storage unit 506, a communication unit 516, and a user interface 512. The control unit 502 may include a control interface 504. The control unit 502 may execute a software 510 to provide some or all of the intelligence of system 100. The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), a graphics processing unit (GPU) or a combination thereof.

The control interface 504 may be used for communication between the control unit 502 and other functional units or devices of system 100. The control interface 504 may also be used for communication that is external to the functional units or devices of system 100. The control interface 504 may receive information from the functional units or devices of system 100, or from remote devices 520, for example the third-party database 122, or may transmit information to the functional units or devices of system 100, or to remote devices 520. The remote devices 520 refer to units or devices external to system 100.

The control interface 504 may be implemented in different ways and may include different implementations depending on which functional units or devices of system 100 or remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of system 100 or remote devices 520.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of system 100. The storage interface 508 may also be used for communication that is external to system 100. The storage interface 508 may receive information from the other functional units or devices of system 100 or from remote devices 520, or may transmit information to the other functional units or devices of system 100 or to remote devices 520. The storage interface 508 may include different implementations depending on which functional units or devices of system 100 or remote devices 520 are being interfaced with the storage unit 506. The storage interface 508 may be implemented with technologies and techniques similar to the implementation of the control interface 504.

The communication unit 516 may enable communication to devices, components, modules, or units of system 100 or to remote devices 520. For example, the communication unit 516 may permit the system 100 to communicate between the server 104 on which the system 100 can be implemented and the client device 102. The communication unit 516 may further permit the devices of system 100 to communicate with remote devices 520 such as an attachment, a peripheral device, or a combination thereof through the network 106.

As previously indicated, the network 106 may span and represent a variety of networks and network topologies. For example, the network 106 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 106. Cable, Ethernet, digital subscriber line (DSL), fiber optic lines, fiber to the home (FTTH), and plain old telephone service (POTS) are examples of wired communication that may be included in the network 106. Further, the network 106 may traverse a number of network topologies and distances. For example, the network 106 may include direct connection, personal area network (PAN), local area network (LAN), metropolitan area network (MAN), wide area network (WAN), or a combination thereof.

The communication unit 516 may also function as a communication hub allowing system 100 to function as part of the network 106 and not be limited to be an end point or terminal unit to the network 106. The communication unit 516 may include active and passive components, such as microelectronics or an antenna, for interaction with the network 106.

The communication unit 516 may include a communication interface 518. The communication interface 518 may be used for communication between the communication unit 516 and other functional units or devices of system 100 or to remote devices 520. The communication interface 518 may receive information from the other functional units or devices of system 100, or from remote devices 520, or may transmit information to the other functional units or devices of the system 100 or to remote devices 520. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by system 100. In aspects, the user interface 512 allows users to interface with the system 100. In aspects, the user interface 512 can present the GUI 400 which any users can interact with to receive offers. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by system 100. The control unit 502 may also execute the software 510 to present information generated by system 100, or to control other functional units of system 100. The display interface 514 may be any GUI such as a display, a projector, a video screen, or any combination thereof.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500 and associated components described herein.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The terms "service" or "services" referred to herein can include a collection of modules or units. A collection of modules or units may be arranged, for example, in software or hardware libraries or development kits in an aspect of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system 100.

The modules, units, or services in the following description of the aspects may be coupled to one another as described or as shown. The coupling may be direct or indirect, without or with intervening items between coupled modules, units, or services. The coupling may be by physical contact or by communication between modules, units, or services.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 200 and 300 and system 100 are cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

The invention claimed is:

1. A computer implemented method comprising:
   receiving, from an external device by one or more computing devices, an image and metadata associated with the image;
   generating, by the one or more computing devices, an intensity map of a grayscale vector corresponding to the image, the intensity map representing changes of detected intensity within the image;
   placing, by the one or more computing devices, an HTML code snippet at a coordinate location within the image, the code snippet being configured to cause output of a browsing activity tracking data, the coordinate location corresponding to a detected change in the grayscale vector, and the coordinate location being identified by a range of x, y coordinates within the image;
   rendering, by the one or more computing devices, an interactive page on a user interface, the interactive page including the image and the metadata associated with the image;
   detecting, by the one or more computing devices, a browsing activity associated with the image;
   activating, by the one or more computing devices, the HTML code snippet in response to detecting the browsing activity at the coordinate location;
   correlating, by the one or more computing devices, the code snippet output with the metadata to generate image browsing track data; and
   generating, by the one or more computing devices, a user browsing profile including the image browsing track data.

2. The computer implemented method of claim 1, further comprising:
   receiving a search query for an item of interest from a user;
   performing a search operation for the item of interest;
   augmenting the search operation with user data from the user browsing profile; and
   providing one or more search results based on the user browsing profile.

3. The computer implemented method of claim 1, wherein the activating further comprises:
   monitoring a time window associated with the browsing activity, and
   in response to the time window exceeding a predetermined time threshold, capturing the browsing activity tracking data output by the HTML code snippet.

4. The computer implemented method of claim 3, wherein the metadata associated with the image correspond to one or more components of an object displayed within the image.

5. The computer implemented method of claim 4, wherein the metadata associated with the image further correspond to identification information of the one or more components and a description of the one or more components.

6. The computer implemented method of claim 1, further comprising:
   detecting a zoom-in activity associated with the browsing activity;
   measuring a time duration of the zoom-in activity;
   in response to the time duration being above a predetermined threshold value:
   identifying at least one coordinate associated with a zoom-in region,
   identifying metadata associated with the at least one coordinate,
   correlating the identified at least one coordinate with the identified metadata to generate updated image browsing track data; and
   augmenting the user browsing profile with the updated image browsing track data.

7. The computer implemented method of claim 1, further comprising:
   receiving a search query for an item of interest; and
   providing one or more search results based on the user browsing profile and a browsing profile of one or more other users.

8. A non-transitory computer-readable medium including instructions that when executed by a processor perform operations comprising:
   receiving, from an external device by one or more computing devices, an image and metadata associated with the image;
   generating, by the one or more computing devices, an intensity map of a grayscale vector corresponding to the image, the intensity map representing changes of detected intensity within the image;
   placing, by the one or more computing devices, an HTML code snippet at a coordinate location within the image, the code snippet being configured to cause output of a browsing activity tracking data, the coordinate location corresponding to a detected change in the grayscale vector, and the coordinate location being identified by a range of x, y coordinates within the image;
   rendering, by the one or more computing devices, an interactive page on a user interface, the interactive page including the image and the metadata associated with the image;
   detecting, by the one or more computing devices, a browsing activity associated with the image;
   activating, by the one or more computing devices, the HTML code snippet in response to detecting the browsing activity at the coordinate location;

correlating, by the one or more computing devices, the code snippet output with the metadata to generate image browsing track data; and generating, by the one or more computing devices, a user browsing profile including the image browsing track data.

9. The non-transitory computer readable medium of claim 8, wherein the operations further comprise:

receiving a search query for an item of interest from a user;

performing a search operation for the item of interest;

augmenting the search operation with user data from the user browsing profile; and providing one or more search results based on the user browsing profile.

10. The non-transitory computer readable medium of claim 8, wherein the activating operation further comprises:

monitoring a time window associated with the browsing activity, and in response to the time window exceeding a predetermined time threshold, capturing the browsing activity tracking data output by the HTML code snippet.

11. The non-transitory computer readable medium of claim 10, wherein the metadata associated with the image correspond to one or more components of an object displayed within the image.

12. The non-transitory computer readable medium of claim 11, wherein the metadata associated with the image further correspond to identification information of the one or more components and a description of the one or more components.

13. The non-transitory computer readable medium of claim 8, wherein the operations further comprise:

detecting a zoom-in activity associated with the browsing activity;

measuring a time duration of the zoom-in activity;

in response to the time duration being above a predetermined threshold value:

identifying at least one coordinate associated with a zoom-in region, identifying metadata associated with the at least one coordinate, correlating the identified at least one coordinate with the identified metadata to generate updated image browsing track data; and augmenting the user browsing profile with the updated image browsing track data.

14. The non-transitory computer readable medium of claim 8, wherein the operations further comprise:

receiving a search query for an item of interest; and providing one or more search results based on the user browsing profile and a browsing profile of one or more other users.

15. A computing system comprising:

non-transitory memory; and one or more processors communicatively connected to the non-transitory memory configured to:

receive an image and metadata associated with the image from an external device;

generate an intensity map of a grayscale vector corresponding to the image, the intensity map representing changes of detected intensity within the image;

place an HTML code snippet at a coordinate location within the image, the code snippet being configured to cause output of a browsing activity tracking data, and the coordinate location corresponding to a detected change in the grayscale vector, and the coordinate location being identified by a range of x, y coordinates within the image;

render an interactive page on a user interface, the interactive page including the image and the metadata associated with the image;

detect a browsing activity associated with the image;

activate the HTML code snippet in response to detecting the browsing activity at the coordinate location;

correlate the code snippet output with the metadata to generate image browsing track data; and generate a user browsing profile including the image browsing track data.

16. The computing system of claim 15, wherein the one or more processors are further configured to:

receive a search query for an item of interest from a user;

perform a search operation for the item of interest;

augment the search operation with user data from the user browsing profile; and provide one or more search results based on the user browsing profile.

17. The computing system of claim 16, wherein, when performing the activating, the one or more processors are further configured to:

monitor a time window associated with the browsing activity, and in response to the time window exceeding a predetermined time threshold, capture the browsing activity tracking data output by the HTML code snippet.

18. The computing system of claim 17, wherein the metadata associated with the image correspond to one or more components of an object displayed within the image.

19. The computing system of claim 18, wherein the metadata associated with the image further correspond to identification information of the one or more components and a description of the one or more components.

20. The computing system of claim 15, wherein the one or more processors are further configured to:

detect a zoom-in activity associated with the browsing activity;

measure a time duration of the zoom-in activity;

in response to the time duration being above a predetermined threshold value:

identify at least one coordinate associated with a zoom-in region, identify metadata associated with the at least one coordinate, correlate the identified at least one coordinate with the identified metadata to generate updated image browsing track data; and augment the user browsing profile with the updated image browsing track data.

* * * * *